US009210723B2

(12) United States Patent
Brown et al.

(10) Patent No.: US 9,210,723 B2
(45) Date of Patent: Dec. 8, 2015

(54) TRANSMISSION CONTROL IN A TELECOMMUNICATION NETWORK

(75) Inventors: Patrick Brown, Cagnes sur Mer (FR); Jérôme Galtier, Nice (FR)

(73) Assignee: Orange, Paris (FR)

( * ) Notice: Subject to any disclaimer, the term of this patent is extended or adjusted under 35 U.S.C. 154(b) by 53 days.

(21) Appl. No.: 13/806,747

(22) PCT Filed: Jun. 27, 2011

(86) PCT No.: PCT/FR2011/051488
§ 371 (c)(1),
(2), (4) Date: Dec. 21, 2012

(87) PCT Pub. No.: WO2012/001285
PCT Pub. Date: Jan. 5, 2012

(65) Prior Publication Data
US 2013/0094412 A1 Apr. 18, 2013

(30) Foreign Application Priority Data
Jun. 30, 2010 (FR) ...................................... 10 02737

(51) Int. Cl.
*H04B 7/00* (2006.01)
*H04W 74/08* (2009.01)

(52) U.S. Cl.
CPC ...... *H04W 74/0816* (2013.01); *H04W 74/0875* (2013.01)

(58) Field of Classification Search
USPC ................. 370/310–328, 338–345, 444–462, 370/509–513; 455/450–515
See application file for complete search history.

(56) References Cited

U.S. PATENT DOCUMENTS

| 7,839,884 | B2 * | 11/2010 | Galtier ......................... 370/444 |
| 8,111,671 | B2 * | 2/2012 | Sakoda et al. ................ 370/336 |
| RE43,705 | E * | 10/2012 | Sherman ....................... 370/461 |
| 8,340,716 | B2 * | 12/2012 | Sekiya et al. .............. 455/553.1 |
| 2003/0161340 | A1 * | 8/2003 | Sherman ....................... 370/445 |

(Continued)

FOREIGN PATENT DOCUMENTS

| WO | WO 2007/051946 A1 | 5/2007 |
| WO | WO 2009/095628 A1 | 8/2009 |

OTHER PUBLICATIONS

Abichar, Z. G. and Chang, J. M. (2005). CONTI: Constant-Time Contention Resolution for WLAN Access. In R. Boutaba, et al. (Eds.), *Networking 2005, LNCS*, vol. 3462 (pp. 358-369). International Federation for Information Procession.

(Continued)

*Primary Examiner* — Man Phan
(74) *Attorney, Agent, or Firm* — Knobbe Martens Olson & Bear LLP

(57) ABSTRACT

The invention relates to a transmission control method implemented by a station having at least one data frame to be transmitted via a wireless telecommunication network. In one aspect, the method comprises, at each selection round from a maximum number of selection rounds: a step of obtaining a value representative of either an authorization to transmit the frame, or of a prohibition to transmit the frame; and, when the value is representative of an authorization for transmission, transmitting an information signal in the network so as to indicate, to the other stations, that the station has obtained a value representative of an authorization for transmission. The transmission of the information signal is at least partially carried out during the transmission of a data frame in the network.

11 Claims, 4 Drawing Sheets

(56) References Cited

U.S. PATENT DOCUMENTS

| | | | |
|---|---|---|---|
| 2010/0220678 A1* | 9/2010 | Wentink | 370/329 |
| 2010/0232380 A1* | 9/2010 | Choi et al. | 370/329 |
| 2010/0322220 A1* | 12/2010 | Brown et al. | 370/338 |
| 2011/0305216 A1* | 12/2011 | Seok | 370/329 |
| 2012/0008608 A1* | 1/2012 | Iacono et al. | 370/338 |

OTHER PUBLICATIONS

Galtier, J. (2007). Analysis and optimization of MAC with constant size congestion window for WLAN. *Second International Conference on Systems and Networks Communications, IEEE*, 6 pages.

Jacquet, et al. (1996). Priority and collision detection with active signaling—The channel access mechanism of HIPERLAN. *Wireless Personal Communications*, 4:11-26.

Information technology—Telecommunications and information exchange between systems—Local and metropolitan area networks—Specific requirements. *Part 11: Wireless LAN Medium Access Control (MAC) and Physical Layer (PHY) Specifications*. ANSI/IEEE Std. 802.11, 1999 Edition.

International Search Report mailed Oct. 20, 2011 for PCT/FR2011/051488 filed Jun. 27, 2011.

\* cited by examiner

TRANSMISSION CONTROL IN A TELECOMMUNICATION NETWORK

RELATED APPLICATIONS

This application is the U.S. National Phase of Application No. PCT/FR2011/051488 entitled "TRANSMISSION CONTROL IN A TELECOMMUNICATION NETWORK" filed Jun. 27, 2011, which designated the United States, and which claims the benefit of French Application No. 1002737 filed Jun. 30, 2010.

BACKGROUND OF THE INVENTION

The present invention relates to the field of wireless telecommunication networks, in particular wireless local networks, or WLANs (Wireless Local Access Networks), compliant with the IEEE 802.11 family of standards.

Such networks are also called Wi-Fi networks. They are used in numerous applications to network stations (for example computers, personal digital assistants and peripheral devices).

The 802.11 standard defines in the document entitled "IEEE 802.11a-1999, IEEE 802.11b-1999, IEEE 802.11d-2001, Part 11: Wireless LAN Medium Access Control (MAC) and Physical Layer (PHY) specifications" a method for controlling traffic in the wireless network. This method uses a Congestion Window (CW) system to control this traffic. According to this standard, in order to determine the instant at which to transmit a data packet, a station randomly draws a random number between 0 and CW-1, the value CW being an integer between two values $CW_{min}$ and $CW_{max}$ specified by the 802.11 standard.

This value CW is used as a countdown counter for the transmission of the packet, this counter being deferred if the station observes that another station is in the process of transmitting. Unfortunately, this congestion window system generates a large number of collisions on the wireless network, resulting in a significant loss of bandwidth from the point of view of the user.

A mechanism referred to as the "tournament method" can be used by the various stations to control the transmissions of packets and limit the collision rate. This tournament method is described in the document authored by Z. Abichar and M. Chang, and entitled "CONTI: Constant-Time Contention Resolution for WLAN Access", IFIP Networking 2005.

The tournament method involves organizing a type of tournament between stations with at least one packet to transmit. A tournament is made up of a certain number of selection rounds, each executed over a time interval of predefined duration allowing each station to have time to hear the transmission of any other station. This duration can typically be equal to the duration of the time interval called "SlotTime" which according to the IEEE 802.11 standard is defined as an elementary interval in the procedure for contention resolution by congestion window. At the start of the tournament, all stations that have to transmit a packet are capable of being authorized to transmit this packet. At each selection round, one or more stations are capable of being removed from the list of stations authorized to transmit, according to whether an authorization or a prohibition to transmit is attributed to them during this selection round. At the end of the tournament, only the non-eliminated stations are authorized to transmit. If several stations remain in contention at the end of the tournament, they transmit at the same time thus causing a collision and therefore a disrupted reception, meaning that it is impossible to correctly receive the transmitted data packet. These stations will then have to participate in the next tournament to attempt to retransmit these packets.

The HiperLAN protocol is one of the first protocols incorporating the tournament feature.

For further information, the person skilled in the art can refer to the document authored by Philippe Jacquet, Pascale Minet, Paul Mühlethaler and Nicolas Rivierre, and entitled "Priority and Collision Detection with Active Signaling—The Channel Access Mechanism of HIPERLAN", Wireless Personal Communications 4: 11-26, 1996.

Documents FR 2 893 206 and WO 2009/095628 explain, respectively, how to considerably improve the effectiveness of tournaments by making the probabilities of drawing dependent on the tournament history and how to ensure that the stations have restricted access times for the transfer of synchronous flows in wireless networks with a good quality of service.

However, the Applicant has observed that networks which implement a tournament method can suffer from a poor rate of bandwidth utilization, the duration of execution of the contention resolution protocol able to represent, for example in the example of a six-round tournament, about 25% of the time needed to transmit a data frame over an IEEE 802.11n network.

OBJECT AND SUMMARY OF THE INVENTION

An objective of the present invention is a transmission control method implementing a tournament method which does not exhibit the drawbacks of the known methods of the prior art.

More particularly, the invention relates to a transmission control method able to be implemented by a station having at least one data frame to transmit via a wireless telecommunication network, the method including, at each selection round of a maximum number of selection rounds:
  a step for obtaining a value representing either an authorization to transmit or a prohibition to transmit said frame; and when said value represents an authorization to transmit:
  a step for transmitting an information signal into said network, in order to indicate to the other stations that said station has obtained a value representing an authorization to transmit.

According to this method, the abovementioned information signal is transmitted at least partly during the transmission of a data frame into the network.

Correlatively, an objective of the invention is a transmission control device for a station having at least one data frame to transmit via a wireless telecommunication network, the device including:
  means for obtaining, at each of a plurality of a maximum number of selection rounds, a value representing either an authorization to transmit or a prohibition to transmit said frame; and when said value represents an authorization to transmit:
  means for transmitting an information signal into said network, in order to indicate to the other stations that said station has obtained a value representing an authorization to transmit.

The transmission means of this device are suitable for transmitting the abovementioned information signal at least partly during the transmission of data frame into the network.

Thus, and generally, the invention provides for transmitting information elements related to the tournament during data frame transmission.

The invention thus provides for effectively using the bandwidth on the wireless telecommunication network, on the one hand because it is not necessary to wait for a period of silence before starting the tournament and on the other hand because the tournament itself does not delay the transmission of a data frame.

Specifically, in a conventional tournament, although the volume of information required by the tournament itself is very limited, the time needed to transmit this information takes up a great deal of time relative to the time taken for the transmission of data frames, the prior art requiring to await a silent period before sending these information elements.

Various possibilities can be implemented in accordance with the invention.

In a first embodiment of the invention, the information signal is transmitted using a frequency band that is sufficiently far away from that used for the transmission of data frames in order that a station can simultaneously transmit the information signal of the tournament while being capable of receiving a data frame.

In this first embodiment of the invention, there is therefore no particular precaution to take for sending the information element of the tournament.

In particular, if the electronics and in particular the filters of the station allow, use can be made of a frequency band at the edge of the frequency band used to transmit the data frames. In the case of an IEEE 802.11n network, there exist, in the 2.4 GHz frequency band, unused 2 MHz bands between the non-overlapping frame transmission channels. Similarly, in the case of IEEE 802.11a and IEEE 802.11n networks, the [5.15-5.17] GHz et [5.33-5.35] GHz frequency bands, of 20 MHz each, are not used.

These frequency bands can therefore be used, in accordance with this first embodiment of the invention, to transmit the information elements of the tournament.

In a second embodiment of the invention, the information element is transmitted using the frequency band used for the transmission of data frames; consequently, the stations which decide to participate in the tournament are not in a position to transmit the information elements of the tournament while receiving data frames.

In this second embodiment, the station therefore waits to have received the destination address contained in the data frame to determine whether it is the destination of this frame, and to initiate, when this is not the case, the transmission of the information signal of the tournament when the end of the frame is being received.

The information signal must be signed with a signature specific to information signals relating to a tournament in order to be able to be distinguished from data frames by the other stations.

By way of example of a specific signature, a particular CDMA code or a particular waveform can be used.

Preferably, the station also waits for the reception of the duration of the data frame in order to await a sufficiently long data frame during which the information signal will be able to be transmitted in its entirety.

In a third embodiment of the invention, the information signal is transmitted with a power level comparable to the noise level, using all channels of the frequency band used for the transmission of data frames, knowing that at least one of these channels is not used for the transmission of data frames.

In this third embodiment, the information signal is embedded in the active channels but can be detected in the other channels.

In a fourth embodiment of the invention, the maximum number of selection rounds to be carried out is reduced if the duration of the transmission of the data frame is less than the duration of the maximum number of selection rounds.

In a fifth particular embodiment of the invention, the transmission of the information signal of the tournament begins or is continued after the end of the transmission of a data frame.

This is because, it is usual to provide, in a wireless telecommunication network, an incompressible period of silence between the end of the transmission of a data frame and the start of the transmission of the next frame.

In particular, in a Wi-Fi network in distributed mode, the stations wait for an incompressible time of 34 microseconds called "DIFS" after the transmission of the frame, and count, after this incompressible time, a random time made up of an integer number of slots (of 9 microseconds) before being able to transmit the next data frame.

FIG. 1 illustrates the abovementioned duration DIFS. It begins with a duration SIFS at the end of which an acknowledgement frame ACK can be transmitted. Given that no data frame can be transmitted at the end of the duration SIFS, this acknowledgement frame cannot be the subject of a collision.

It is recalled that the PCF mode provides for a "master" station to be authorized to transmit a packet at the end of PIFS, thereby allowing it to take possession of the channel without running the risk of a collision.

In Wi-Fi, this mode is not implemented since it is in practice impossible to ensure that only one "master" station is transmitting on this is channel.

Consequently, the invention proposes a sixth embodiment, in which the transmission of information signals of the tournament begins or restarts after a determined period of silence (for example PIFS) counted from the end of the transmission of a data frame.

In this sixth embodiment, the information signal is transmitted with a power level allowing the other stations to detect the occupation of the transmission channel.

This feature enables the other stations listening to the network to detect the end of the transmission of the elements of the tournament such that they can suspend transmission of their next data frame, thus avoiding a collision.

Be that as it may, at the end of the tournament, the winning station or stations can transmit a data frame during the first period of availability of the radio channel following the transmission of the frame during which the tournament had taken place.

In the case of a network compliant with the IEEE 802.11 standard, the station waits for the next interval of duration PIFS.

If the tournament is ended after an interval without transmission of duration greater than PIFS, the winning station or stations can transmit from the moment the tournament ends.

In one embodiment, the various steps of the control method according to the invention are determined by computer program instructions.

Consequently, another objective of the invention is a computer program on an information medium, this program being able to be implemented in a station or more generally in a computer, this program including instructions suitable for implementing steps of a resolution method such as described above.

This program can use any programming language and be in the form of source code, object code or a code intermediate between source code and object code, such as in a partially compiled form or in any other desirable form.

Another objective of the invention is an information medium readable by a computer and including instructions of a computer program as mentioned above.

The information medium can be any entity or device capable of storing the program.

For example, the information medium can include a means of storage such as a ROM, for example a CD-ROM or a microelectronic circuit ROM, or a magnetic recording means, for example a floppy disk or a hard disk.

On the other hand, the information medium can be a transmittable medium such as an electrical or optical signal, which can be conveyed via an electrical or optical cable, via radio or via other means.

The program according to the invention can in particular be downloaded over an Internet type network.

Alternatively the information medium can be an integrated circuit in which the program is incorporated, the circuit being adapted or to be used in the execution of the method in question.

According to another implementation, the invention is implemented by means of software and/or hardware components. In this regard, the term module can in this document just as well refer to a software component as to a hardware component. A software component corresponds to one or more computer programs, one or more subroutines of a program or more generally to any element of a program designed to implement a function or a set of functions. A hardware component corresponds to any element of a hardware assembly designed to put forward a function or a set of functions.

BRIEF DESCRIPTION OF THE DRAWINGS

Other aims, features and advantages of the invention will become clear through the following description given purely by way of non-limiting example and with reference to the accompanying drawings in which.

DETAILED DESCRIPTION OF EMBODIMENTS OF THE INVENTION

Figure 1:
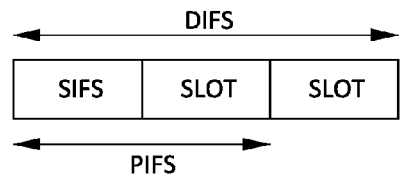
FIG. 1 already described represents a duration PIFS used in an IEEE 802.11 network.
Figure 2:
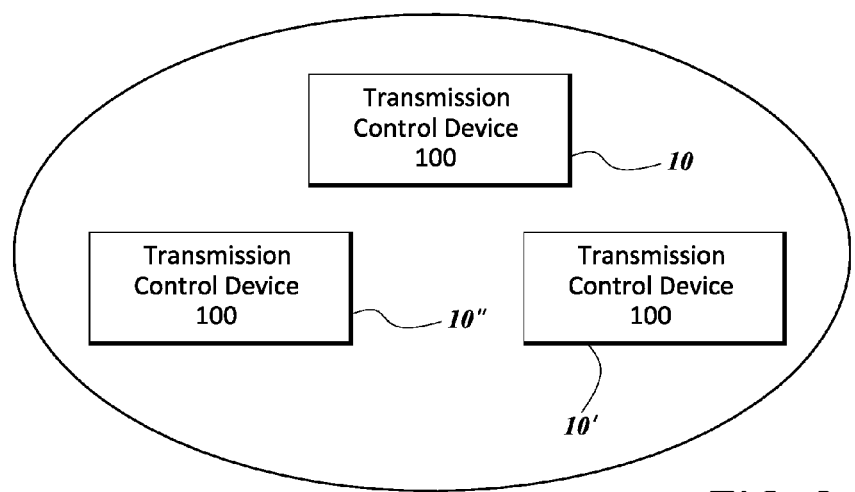
FIG. 2 represents a wireless telecommunication network, with stations in accordance with the invention in a particular embodiment.

FIG. 2 represents a wireless telecommunication network 1 in which stations 10, 10', 10" in accordance with the invention move around.

Each of these stations 10 includes a transmission control device 100 in accordance with the invention.

Figure 3:
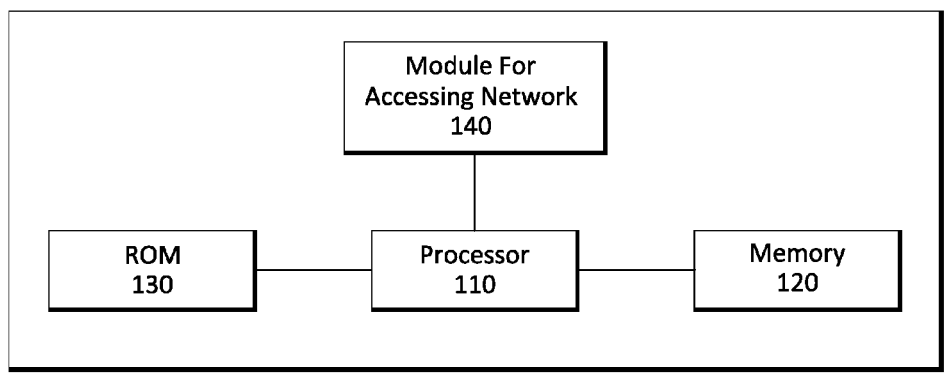
FIG. 3 represents a transmission control device in accordance with the invention in a particular embodiment.

In the mode described in FIG. 3, the control device 100 according to the invention includes a processor 110, a memory 120, a read-only memory (ROM) 130, and a module 140 for accessing the network 1 in order to transmit and receive packets and signals in the wireless telecommunication network 1.

These various elements are interlinked by a bus system, not referenced.

The means 140 for sending and receiving data packets for signals on the wireless communication network 1 are, in the example described here, formed by an access board for accessing the network 1 in accordance with the IEEE 802.11 standard family.

To implement the invention, the tournament method mentioned in the introduction is used.

In the tournament method, such as described by CONTI in the document referred to earlier, authorizations or prohibitions to transmit are attributed to the stations using binary random variables having a Bernoulli distribution law.

This distribution law is defined by a probability of drawing an authorization to transmit. Such a probability is thus assigned to each station and to each selection round.

The probabilities are chosen preferably in such a way that statistically the collision rate is as low as possible.

A procedure to choose the probabilities optimally is presented in the document entitled "Analysis and optimization of MAC with constant size congestion window for WLAN" by J. Galtier, Proceedings on the Third International Conference on Services and Networks Communications, INRIA, Library of Congress Number 2007930108, August 2007.

According to a particular embodiment described in patent document WO2007/051946, the probabilities assigned to the various stations during a selection round may be a function of the authorizations or prohibitions to transmit drawn at the previous selection rounds, so as to minimize the collision rate.

The stations 10, 10', 10" each include a transmission management module which provides for implementing a transmission control method.

Hereafter in the description, the following notations will be used:

k is the index identifying the selection round during a tournament;

$k_{max}$ is the maximum number of selection rounds for a tournament;

r is a binary random variable;

r(k) is the value of the binary random value r drawn at the selection round of index k; r(k) belongs to the set $\{0, 1\}$, the value "1" usually representing an authorization to transmit, while the value "0" represents a prohibition to transmit.

The sequence of r(k) assigned to the station is here referred to as a key.

Figure 4:
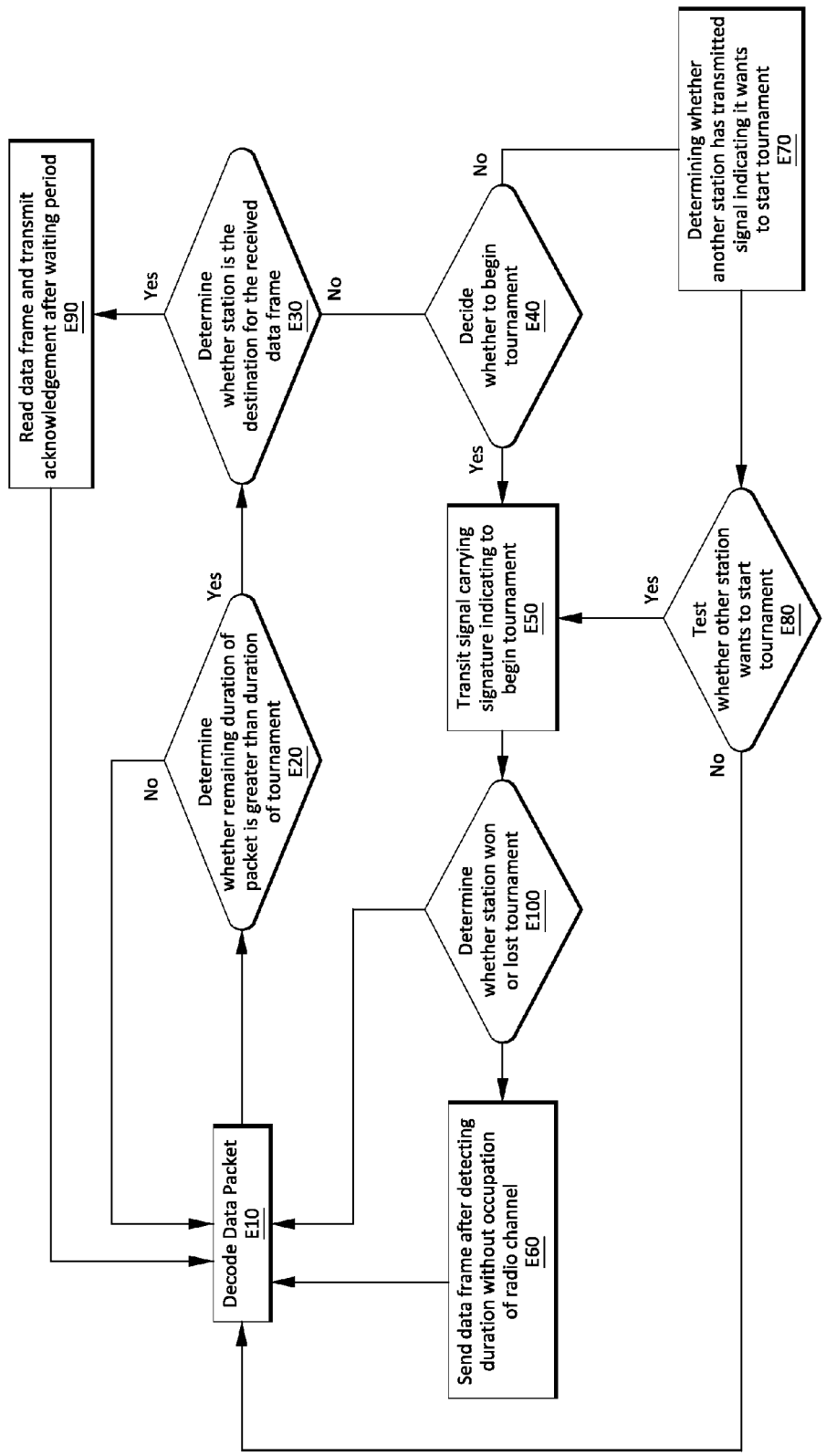
FIGS. 4 and 5 represent, in flow-chart form, the main steps of a transmission control method in accordance with the invention in a particular embodiment.

The main steps E10 to E100 and F10 to F90 of a transmission control method according to the invention are described with reference to FIGS. 4 and 5. This method is implemented by the transmission management module of a station 10 having at least one data packet to transmit over the network 1.

All stations that have a data packet to transmit implement this same method simultaneously without mutual interrogation or dialog being needed between these stations, other than that which is described in the steps described below.

The method is described for a station 10, all the other stations implementing this same method.

The method described with reference to FIG. 5 corresponds to that referred to as a tournament.

Stations having packets to transmit all start the contention resolution procedure at the same instant by implementing a tournament, this instant being a function of a criterion defined as follows.

During a first step E10, it is assumed that the station 10 decodes a data packet and that it reads in this packet the duration of this packet (physical layer) and the destination address of this packet (MAC layer). With the duration of the packet, said station knows the remaining time before the end of the packet, given the read duration of the MAC header. A predetermined duration of time after the reading of the MAC address fixes the start of the tournament.

During a step E20, the station 10 determines whether the remaining duration of the packet is greater than the duration of the tournament.

If this is not the case, in this example embodiment, the result of the test E20 is negative and the station 10 returns to step E10 to wait for the next data frame. In another embodiment, the station decides to proceed with a shortened tournament (for example, five rounds instead of six) if the duration of the shortened tournament is less than the remaining duration of the packet.

However, if the duration of the data frame is greater than the duration of tournament, the result of the test E20 is positive.

This test is then followed by a step E30 during which the station 10 determines whether it is the destination for the data frame received at step E10.

If this is not the case, the result of the test E30 is negative, and the station 10 decides, during a step E40, whether it must begin a tournament.

If this is the case, the result of the test E40 is positive.

This step is followed by a step E50 during which the station 10 transmits a signal carrying a signature S1 indicating that it wants to begin the tournament.

Figure 5:
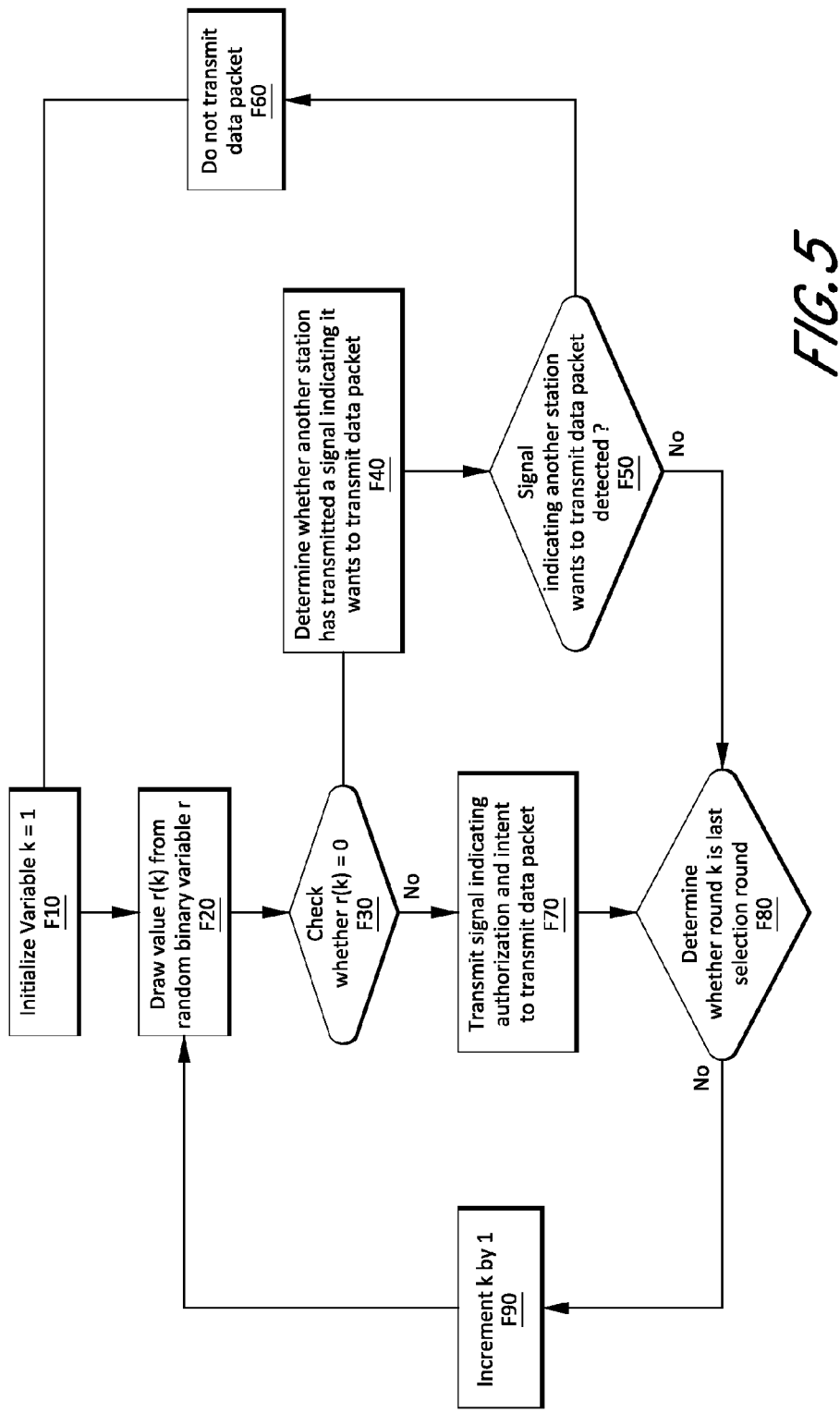

During the same step E50, the station participates in the tournament, as described now with reference to FIG. 5. The tournament corresponds to steps F10 to F90 represented in this figure.

During a step F10, the station 10 initializes a variable k at the value 1, this variable representing the index of the current selection round.

This step F10 is followed by a step F20 for drawing a value r(k) from a binary random variable r, associated with the station for the current selection round of index k.

The probability that this binary random variable r(k) takes, at the selection round of index k, the predetermined value "1" is denoted by p(k).

According to one embodiment, this probability p(k) depends on the values drawn at the previous selection rounds.

The probability that this binary random variable r(k) takes, at round k, the predetermined value "0" is therefore (1−p(k)).

This step F20 for drawing a random variable is followed by a step F30 during which a check is carried out as to whether the drawn binary value r(k) is equal to "0".

If this is the case (i.e. a prohibition to transmit), this test F30 is followed by a step F40 during which the station 10 listens to the wireless telecommunication network to determine whether another station 10', 10" has transmitted a signal S2 indicating that this other station 10, 10" wants to transmit a data packet.

If such a signal is detected (result of the test of step F50 positive), the method ends with step F60, without the station 10 having transmitted its data packet.

During this step F60, the station 10 waits for the end of the selection rounds, and listens to the signals transmitted by the other stations. It waits for the end of the tournament, storing the representative information transmitted during the tournament.

However, if at step F40 no signal is detected (result of the test of step F50 negative), this test is followed by a test at step F80 during which it is determined whether round k is the last selection round, this amounting to checking whether the value k is equal to the value $k_{max}$.

If k is strictly less than $k_{max}$, the result of the test of step F80 is negative. This step is then followed by a step F90 during which the value of the variable k is incremented by one unit, with the intention of executing the next selection round.

If during the test of step F30 it is determined that the drawn binary value is equal to the predetermined value 1 (i.e. an authorization to transmit), this test F30 is followed by a step F70 for transmitting a signal indicating that the station 100 has obtained an authorization to transmit and intends to transmit a data packet via the network.

This step F70 for transmitting a signal is followed by step F80 already described during which a check is made as to whether the current selection round k is the last selection round.

If this is not the case, this test F80 is followed by the incrementing step F90 already described.

The incrementing step F90 is followed by a new execution of steps F20 to F80 already described, for the next selection round and according to the sequencing logic for the steps which has just been described.

However, if the test of step F80 is positive (k=kmax), the tournament is finished and the station stores an information item representing the fact that it has won the tournament.

After the tournament is executed (return to the general step E50 of FIG. 4), the control method according to the invention implements a step E100 during which the station determines, from the information stored at step F60 (the station has lost the tournament) or F80 (the station has won the tournament), whether it has won or lost the tournament.

If the station has lost the tournament, the station re-executes step E10 described previously.

However if the station has won the tournament, the control method according to the invention is continued with a step E60 during which the station sends a data frame after having detected a duration PIFS without occupation of the radio channel. This duration typically appears from the end of the transmission of the data frame during which the tournament has taken place, or from the end of the transmission of the acknowledgement of this frame.

If, during step E40, it is determined that the station does not want to start the tournament, it listens during a step E70, to determine whether another station has transmitted the signal S1 representing the fact that this other station wants to start the tournament.

If this is the case, the result of a test E80 is positive. This test is followed by step E50 already described, during which the station 10 can decide to join the tournament by implementing step E50 already described.

However, if no station wants to participate in the tournament, the result of the test E80 is negative and the station 10 can implement step E10 already described.

If, at step E30, it is determined that the station 10 is the destination of the data frame received at step E10, this step E30 is followed by a step E90 during which the station 10 reads the data frame and transmits an acknowledgement after the waiting period SIFS, following the conventional method of IEEE 802.11.

But in the example embodiment described here, it cannot participate in the tournament.

This step E90 is followed by step E10 already described.

Figure 6:
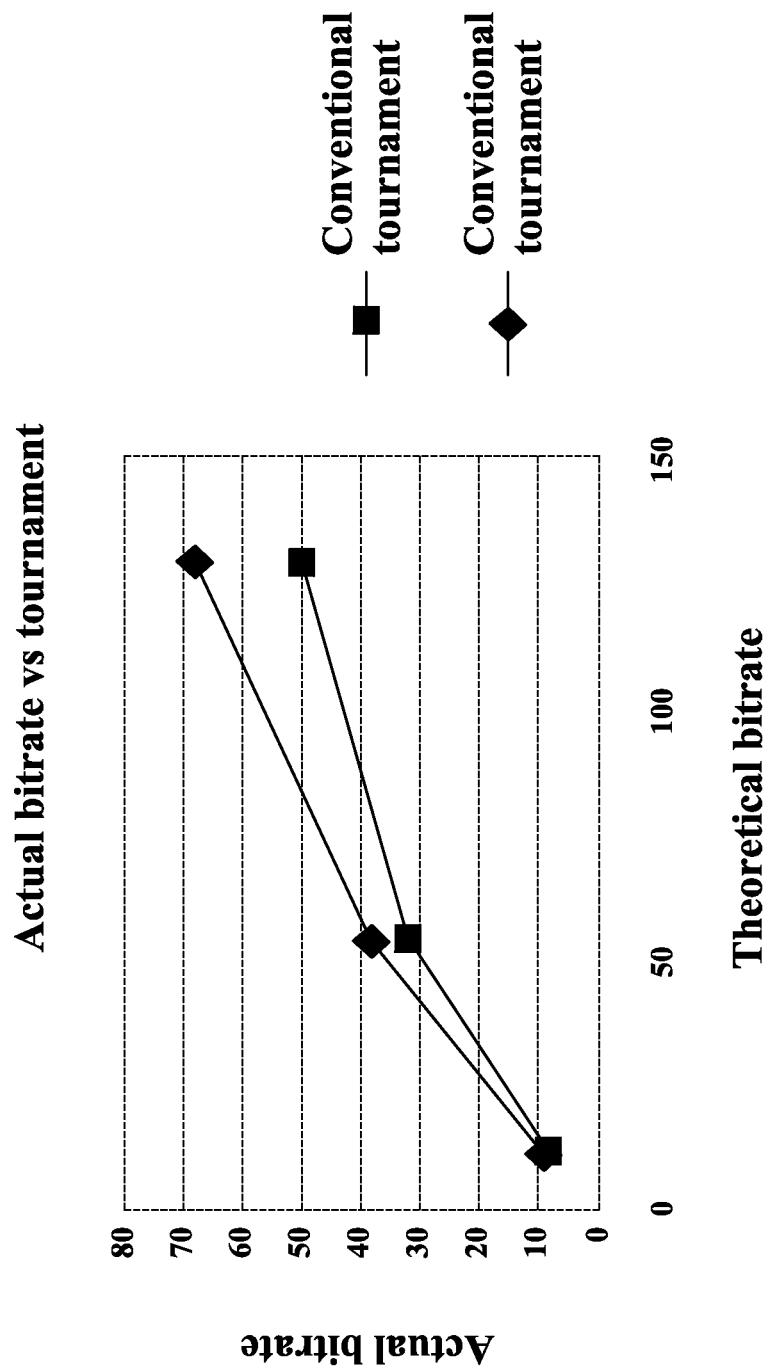
FIG. 6 illustrates the gain in bandwidth through the implementation of a particular embodiment of the invention.

FIG. 6 illustrates the benefit of the invention when it is implemented on a network functioning on the basis of the 802.11n standard. More specifically, it presents the actual bitrates obtained with and without the implementation of the control method according to the invention for theoretical bitrates of 11.54 and 130 megabits per second when a tournament with six selection rounds is implemented, according to that which is described in document WO 2009/095628 on pages 7 and 8 (method called "Conventional tournament" in the legend of FIG. 6 of this present application) on the one hand, and according to the present invention (called "Mechanism tournament" in the legend of FIG. 6 of this present application) on the other hand.

Another Embodiment of the Invention

The description just given with reference to FIGS. 1 to 6 relates to the embodiment of the invention in which a station waits for the reception of a sufficiently long data frame in order that the whole tournament can be played during this frame.

As a variant, a tournament can begin to be played at the same time as the reception of a data frame that is too short for the tournament, and the tournament can be suspended in order to resume it after an incompressible period of silence.

In this case, step E20 is not necessary. The tournament is suspended at the end of the period of transmission of the packet in progress. After a period of silence SIFS, defined in the 802.11 standard, the station listens for the possible acknowledgement of the current transmission. As soon as a waiting period PIFS is observed, either at the end of the current packet if there is no acknowledgement or at the end of the acknowledgement, the station transmits a padding bit indicating to the other stations that the suspended tournament is resumed. The tournament is then continued according to the known method of tournaments, described in particular in document WO 2009/095628 on pages 7-8 and 20.

Allowing the parallel execution, in part, at least of one tournament and the transmission of a data frame provides for reducing the total channel occupation time consumed by the tournament in the known method of tournaments, such as described in aforementioned document WO 2009/095628.

When the tournament is resumed, it is necessary to implement the means for preventing the stations not implementing the mechanism according to the invention from interfering with the tournament in progress. One means for achieving this objective is for example to not allow having keys with a high number of consecutive values of r(k) equal to 0: this is because this would create a period of silence, able to make the stations not implementing the mechanism according to the invention believe that the radio channel is free.

The person skilled in the art will understand that the total number of keys offered by the tournament described in this variant is equal to the number of possible keys before the interruption to the tournament, multiplied by the number of possible keys after the interruption. Consequently, the station decision provided for by this variant is not less effective due to the interruption to the tournament than a tournament carried out by only one holder.

In another embodiment of the invention, in order to play the tournament, a frequency is used that is sufficiently far away from the frequency used for the transmission of data frames into the network.

In such an embodiment, the information elements of the tournament can be sent without it being necessary to check whether or not a data frame is received on the network.

Consequently, in this embodiment, the method consists in executing steps F5 to F80, the transmission of a data frame being carried out by the station which has won the tournament at the end of step F80 without particular precaution, when the result of this step F80 is positive (k=kmax).

In each of the embodiments of the invention, the tournaments can alternate with conventional contention periods in such a way that the stations not implementing the invention can transmit at their turn.

The invention claimed is:

1. A transmission control method able to be implemented by a first station participating in a tournament comprising a maximum number of rounds of selecting stations having authorization to transmit a data frame, said first station having at least one data frame to transmit via a wireless telecommunication network, the method comprising:

conducting a round (k) of selecting stations, wherein said round (k) comprises:

drawing a random binary value (r(k)) representative either of an authorization to transmit or of a prohibition to transmit said data frame; and when said value represents an authorization to transmit:

transmitting an information signal into said network, in order to indicate to other stations that said first station has obtained a value representing an authorization to transmit;

wherein the transmission of said information signal is carried out at least partly during the transmission of a data frame into said network;

and wherein, when said value represents a prohibition to transmit, said first station does not participate in additional selection rounds in said tournament if it detects, by listening to the wireless telecommunication network, that another station has transmitted a signal indicating that said other station wants to transmit a data packet;

repeating said round until said maximum number of rounds has been reached;

wherein, when said maximum number of rounds has been reached, a station authorized to transmit a data frame transmits a data frame.

2. The control method as claimed in claim 1, wherein said signal is transmitted using a frequency band that is sufficiently far away from that used for the transmission of said data frames in order that said first station can transmit the information signal while being capable of receiving a data frame.

3. The control method as claimed in claim 1, wherein said information signal is transmitted using the frequency band used for the transmission of said data frames, the transmission of said information element being initiated after reception of a destination address contained in said data frame, said information signal being signed with a signature specific to the information signals.

4. The control method as claimed in claim 3 further comprising waiting for a sufficiently long data frame in order to wholly transmit said information signal during the transmission of said data frame.

5. The control method as claimed in claim 1, wherein said information signal is transmitted with a power level comparable to a noise level, using all channels of a frequency band used for the transmission of said data frames, at least one of said channels not being used for the transmission of said data frames.

6. The control method as claimed in claim 1, wherein the transmission of said information signal begins or restarts after a determined period of silence (PIFS) counted after the end of the transmission of a data frame, said information signal being transmitted with a power level enabling other stations to detect the occupation of a transmission channel.

7. The control method as claimed in claim 1, wherein the maximum number of selection rounds to be carried out is reduced if the duration of the transmission of the data frame is less than the duration of said maximum number of selection rounds.

8. A transmission control device for a station having at least one data frame to transmit via a wireless telecommunication network, the device including:

means for drawing, at each of a plurality of a maximum number of rounds of selecting stations in a tournament, a random binary value representing either an authorization to transmit or a prohibition to transmit said data frame; and when said value represents an authorization to transmit;

means for transmitting an information signal into said network, in order to indicate to other stations that said station has obtained a value representing an authorization to transmit;

wherein said transmission means are able to transmit said information signal in such a way that said transmission is carried out at least partly during the transmission of a data frame into said network;

means for transmitting a data frame when said maximum number of rounds has been reached if said station is authorized to transmit said data frame; and means for eliminating said station from participation in additional selection rounds in said tournament when said value represents a prohibition to transmit if said station detects, by listening to the wireless telecommunication network, that another station has transmitted a signal indicating that said other station wants to transmit a data packet.

9. A non-transitory computer readable medium comprising instructions stored thereon which, when executed by a computer, implement a transmission control method able to be implemented by a first station participating in a tournament comprising a maximum number of rounds of selecting stations having authorization to transmit a data frame, said first station having at least one data frame to transmit via a wireless telecommunication network, the method comprising:

conducting a round (k) of selecting stations, wherein said round (k) comprises:

drawing a random binary value (r(k)) representative either of an authorization to transmit or of a prohibition to transmit said data frame; and when said value represents an authorization to transmit:

transmitting an information signal into said network, in order to indicate to other stations that said first station has obtained a value representing an authorization to transmit;

wherein the transmission of said information signal is carried out at least partly during the transmission of a data frame into said network;

and wherein, when said value represents a prohibition to transmit, said first station does not participate in additional selection rounds in said tournament if it detects, by listening to the wireless telecommunication network, that another station has transmitted a signal indicating that said other station wants to transmit a data packet;

repeating said round until said maximum number of rounds has been reached;

wherein, when said maximum number of rounds has been reached, a station authorized to transmit a data frame transmits a data frame.

10. A non-transitory computer readable medium comprising instructions stored thereon which, when executed by a computer, implement a transmission control method able to be implemented by a first station participating in a tournament comprising a maximum number of rounds of selecting stations having authorization to transmit a data frame, said first station having at least one data frame to transmit via a wireless telecommunication network, the method comprising:

conducting a round (k) of selecting stations, wherein said round (k) comprises:

drawing a random binary value (r(k)) representative either of an authorization to transmit or of a prohibition to transmit said data frame; and when said value represents an authorization to transmit:

transmitting an information signal into said network, in order to indicate to other stations that said first station has obtained a value representing an authorization to transmit;

wherein the transmission of said information signal is carried out at least partly during the transmission of a data frame into said network, wherein the maximum number of selection rounds to be carried out is reduced if the duration of the transmission of the data frame is less than the duration of said maximum number of selection rounds;

and wherein, when said value represents a prohibition to transmit, said first station does not participate in additional selection rounds in said tournament if it detects, by listening to the wireless telecommunication network, that another station has transmitted a signal indicating that said other station wants to transmit a data packet;

repeating said round until said maximum number of rounds has been reached;

wherein, when said maximum number of rounds has been reached, a station authorized to transmit a data frame transmits a data frame.

11. A transmission control device for a station having at least one data frame to transmit via a wireless telecommunication network, the device including:

a processor configured to draw, at each of a plurality of a maximum number of rounds of selecting stations in a tournament, a random binary value representing either an authorization to transmit or a prohibition to transmit the data frame; and when the value represents an authorization to transmit;

a transmitter configured to transmit an information signal into the network, in order to indicate to other stations that the station has obtained a value representing an authorization to transmit;

wherein said transmitter is able to transmit said information signal in such a way that the transmission is carried out at least partly during the transmission of a data frame into said network; and a transmitter configured to transmit a data frame when said maximum number of rounds has been reached if said station is authorized to transmit said data frame; and a processor configured to eliminate said station from participation in additional selection rounds in said tournament when said value represents a prohibition to transmit if said station detects, by listening to the wireless telecommunication network, that another station has transmitted a signal indicating that said other station wants to transmit a data packet.

* * * * *